United States Patent
Kang et al.

(10) Patent No.: US 7,644,310 B2
(45) Date of Patent: Jan. 5, 2010

(54) SEMICONDUCTOR IC INCORPORATING A CO-DEBUGGING FUNCTION AND TEST SYSTEM

(75) Inventors: Shin-Chan Kang, Yongin (KR); Sun-Kyu Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/193,945

(22) Filed: Aug. 19, 2008

(65) Prior Publication Data

US 2008/0307260 A1    Dec. 11, 2008

Related U.S. Application Data

(63) Continuation of application No. 11/022,990, filed on Dec. 28, 2004, now abandoned.

(30) Foreign Application Priority Data

Feb. 10, 2004    (KR) ............................... 2004-08788

(51) Int. Cl.
*G06F 11/00* (2006.01)
(52) U.S. Cl. ........................................ 714/30; 714/734
(58) Field of Classification Search .................. 714/30, 714/31, 32, 45, 726, 733, 734
See application file for complete search history.

(56) References Cited

U.S. PATENT DOCUMENTS

| | | | |
|---|---|---|---|
| 5,928,374 A | 7/1999 | Shimizu et al. | |
| 6,243,836 B1 | 6/2001 | Whalen | |
| 6,324,684 B1 | 11/2001 | Matt et al. | |
| 6,618,839 B1 * | 9/2003 | Beardslee et al. | 716/4 |
| 6,668,339 B1 | 12/2003 | Maeda | |
| 7,222,315 B2 * | 5/2007 | Schubert et al. | 716/4 |
| 2001/0034598 A1 | 10/2001 | Swoboda | |
| 2003/0046625 A1 | 3/2003 | Menon et al. | |
| 2003/0056154 A1* | 3/2003 | Edwards et al. | 714/45 |
| 2003/0131296 A1 | 7/2003 | Park et al. | |
| 2005/0193276 A1 | 9/2005 | Kang et al. | |

FOREIGN PATENT DOCUMENTS

| | | |
|---|---|---|
| JP | 10-134011 | 5/1998 |
| JP | 10134011 A | 5/1998 |

OTHER PUBLICATIONS

Arm Limited; CoreSight: Architechture Specification; Sep. 29, 2004; pp. i, ii, 8-2, 8-3, 10-7, 10-9, 17-5, 17-9; http://wvvw.arm.com.

* cited by examiner

*Primary Examiner*—Dieu-Minh Le
(74) *Attorney, Agent, or Firm*—Volentine & Whitt, PLLC

(57) ABSTRACT

A semiconductor IC capable of debugging two or more processors at the same time by means of a single debugger and a semiconductor IC test system. The semiconductor IC includes processors operating at different frequencies, a trigger circuit which causes all of the processors to be in a debugging state when one of the processors is in the debugging state, and a JTAG circuit applying a boundary scan operation to the processors connected to a JTAG pin in series.

6 Claims, 5 Drawing Sheets

SEMICONDUCTOR IC INCORPORATING A CO-DEBUGGING FUNCTION AND TEST SYSTEM

CROSS-REFERENCE TO RELATED APPLICATIONS

This application is a continuation application of application Ser. No. 11/022,990 filed on Dec. 28, 2004, which claims priority to Korean Patent Application 2004-08788 filed Feb. 10, 2004, the disclosure of which is hereby incorporated by reference in its entirety.

BACKGROUND OF THE INVENTION

1. Field of the Invention

The present invention relates generally to a semiconductor integrated circuit (IC) test circuit and more specifically to a semiconductor IC supporting a co-debugging function and a semiconductor IC test system.

2. Description of the Related Art

Contemporary semiconductor devices implementing complicated protocols, such as Code Division Multiple Access (CDMA), Motion Picture Experts Group (MPEG), Voice Over Internet Protocol (VOIP), requiring real-time processing typically use system-on-a-chip (SOC) technology. This use of SOC technology is made possible in large part by dramatic improvements in sub-micron fabrication and design technologies.

SOC technology adopted in application areas using complicated protocols typically enables the computation of digital image and/or audio data. SOC technology as applied in such application areas typically includes the provision of a conventional signal processing unit. Moreover, SOC provides a real time operating system (RTOS) for managing system resources effectively. The RTOS provided by a SOC is typically executed by means of an application program running on the signal processing unit.

Where two or more processors, such as a Central Processing Unit (CPU) and a Digital Signal Processor (DSP), coexist in one SOC, a separate debugger is typically provided for each processor. Therefore, the two processors can not be co-debugged at the same time. The term "co-debugging" generally defines a process wherein a plurality of processors are debugged simultaneously using a single debugger.

Accordingly, in a conventional SOC implementation having two or more processors, each individual processor is connected to its own unique set of joint test action group (JTAG) pins. With this configuration, the processors are unable to transmit or receive signals, such as interrupts, to each other. This inability makes it impossible for co-debugging to occur. For example, if a SOC includes an ARM type CPU and a TEAK type DSP then an ARM debugger is typically used to debug the ARM CPU core and a TEAK debugger is used to debug the TEAK DSP core. As a result, the TEAK debugger cannot be stopped by setting a breakpoint to the TEAK debugger when the CPU core is being debugged.

SUMMARY OF THE INVENTION

The present invention provides a semiconductor IC supporting a co-debugging function by connecting two or more processors to one JTAG in series and inserting a trigger circuit between the processors. The present invention also provides a semiconductor IC test system including a semiconductor IC supporting the co-debugging function.

According to one aspect of the present invention, a semiconductor IC supporting the co-debugging function comprises a first processor operating at a first frequency, a second processor operating at a second frequency different from the first frequency, and a trigger circuit which causes both processors to be in a debugging state if one of the processors is in the debugging state. The semiconductor IC further comprises a JTAG circuit which receives test data from a JTAG terminal when the first and second processors are in the debugging state, and executes a boundary scan operation on the first and second processors, thereby outputting test data to the JTAG terminal.

The first and second processors are preferably two CPUs or one CPU and one DSP.

In a related aspect, the present invention provides that the first processor outputs a first signal indicating whether the first processor is in a debugging state. The trigger circuit receives the first signal and outputs a second signal which determines whether the second processor assumes the debugging state. The first signal is received by the trigger circuit in synchronization with the first frequency and the second signal is output in synchronization with the second frequency. When the second signal output by the trigger circuit has a high logic level then the second processor assumes the debugging state.

The second processor outputs a third signal indicating whether the second processor is in the debugging state. The trigger circuit receives the third signal from the second processor in synchronization with the second frequency and outputs a fourth signal synchronized with the first frequency. When the fourth signal has a high logic level it causes the first processor to assume the debugging state.

In yet another related aspect, the present invention provides a trigger circuit comprising a first synchronizing circuit receiving the first signal and outputting the second signal, a second synchronizing circuit receiving the third signal and outputting a fourth signal, and a state machine controlling the first and second synchronizing operations.

The state machine preferably controls the second synchronizing circuit causing the second synchronizing circuit to output the fourth signal at a low logic level when the first processor is in the debugging state.

The JTAG circuit preferably includes a test access port (TAP) controller controlling a boundary scan operation and a plurality of boundary scan cells connected in series.

According to another aspect of the present invention, a semiconductor IC test system comprises a debug host executing a debugging operation according to a debugging program, a host interface converting a signal input from the debug host to a JTAG interface signal, and a semiconductor IC receiving a JTAG interface signal from the host interface to execute a co-debugging operation.

The semiconductor IC supporting the co-debugging function preferably comprises a first processor operating at a first frequency, a second processor operating at a second frequency different from the first frequency, and a trigger circuit which causes both processors to be in a debugging state if one of the processors is in the debugging state. The semiconductor IC further comprises a JTAG circuit which receives test data from a JTAG terminal when the first and second processors are in the debugging state, and executes a boundary scan operation on the first and second processors, thereby outputting test data to the JTAG terminal.

The first and second processors are preferably two CPUs or one CPU and one DSP.

In a related aspect, the present invention provides that the first processor outputs a first signal indicating whether the first processor is in a debugging state. The trigger circuit receives the first signal and outputs a second signal which determines whether the second processor assumes the debugging state. The first signal is received by the trigger circuit in synchronization with the first frequency and the second signal is output in synchronization with the second frequency. When the second signal output by the trigger circuit has a high logic level then the second circuit assumes the debugging state.

The second processor outputs a third signal indicating whether the second processor is in the debugging state. The trigger circuit receives the third signal from the second processor in synchronization with the second frequency and outputs a fourth signal synchronized with the first frequency. When the fourth signal has a high logic level it causes the first processor to assume the debugging state.

In yet another related aspect, the present invention provides a trigger circuit comprising a first synchronizing circuit receiving the first signal and outputting the second signal, a second synchronizing circuit receiving the third signal and outputting a fourth signal, and a state machine controlling the first and second synchronizing operations.

The state machine preferably controls the second synchronizing circuit, causing the second synchronizing circuit to output the fourth signal at a low logic level when the first processor is in the debugging state.

The JTAG circuit includes a TAP controller controlling a boundary scan operation and plurality of boundary scan cells connected in series.

BRIEF DESCRIPTION OF THE DRAWINGS

The accompanying drawings illustrate several selected embodiments of the present invention and are incorporated in and constitute a part of this specification. In the drawings:

FIG. 3 further describes the operation of part of the synchronizing circuit and FIG. 4 further describes the operation of another part of the synchronizing circuit.

DETAILED DESCRIPTION OF PREFERRED EMBODIMENTS

Figure 1:
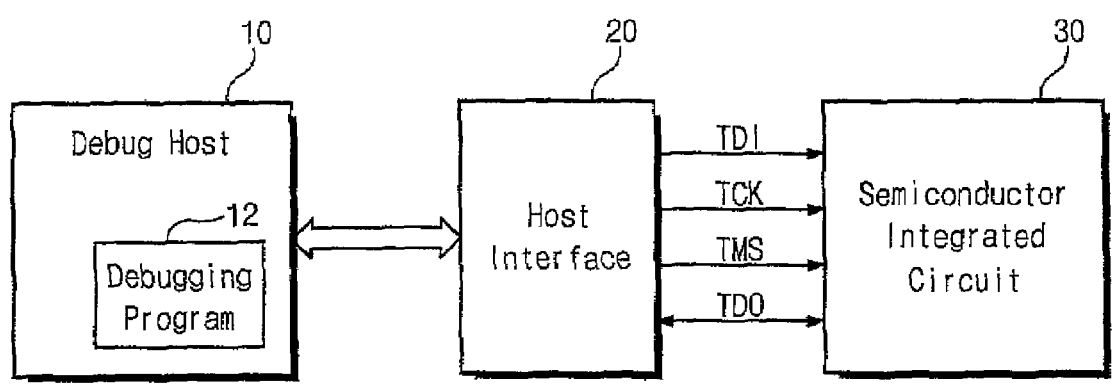
FIG. 1 is a schematic block diagram of a semiconductor IC test system in accordance with one aspect of the present invention.

The present invention will now be described more fully with reference to the accompanying drawings, in which several exemplary embodiments of the present invention are shown. Throughout the drawings, like reference numerals are used to refer to like elements.

FIG. 1 is a schematic block diagram of a semiconductor IC test system in accordance with one aspect of the present invention. Referring to FIG. 1, the semiconductor IC test system generally includes a debug host 10, a host interface 20 and a semiconductor IC 30.

Debug host 10 comprises a computer system (e.g., a personal computer) and includes a debugging program 12 implementing sequential test operations. Debug host 10 receives user input signals and sends addresses, control signals and data signals to host interface 20 according to various protocols determined by system designers.

Host interface 20 receives a signal from debug host 10, which it converts to a JTAG interface signal. The JTAG interface signal includes, for example, one or more of a test mode select (TMS) signal, a test clock input (TCK) signal, a test data input (TDI) signal and a test data output (TDO) signal. As presently preferred, host interface 20 sends the TMS, TCK and TDI signals to semiconductor IC 30 and receives the TDO signal from semiconductor IC 30.

Semiconductor IC 30 is a system-on-a-chip (SOC) including two or more processors using different frequencies for debugging. Semiconductor IC 30 includes an ARM type CPU and a TEAK type DSP.

Conventionally, an ARM debugger is used to debug the ARM type CPU and a TEAK debugger is used to debug the TEAK type DSP. According to one aspect of the present invention, however, the ARM type CPU and TEAK type DSP can be co-debugged by means of a single debug host 10.

Figure 2:
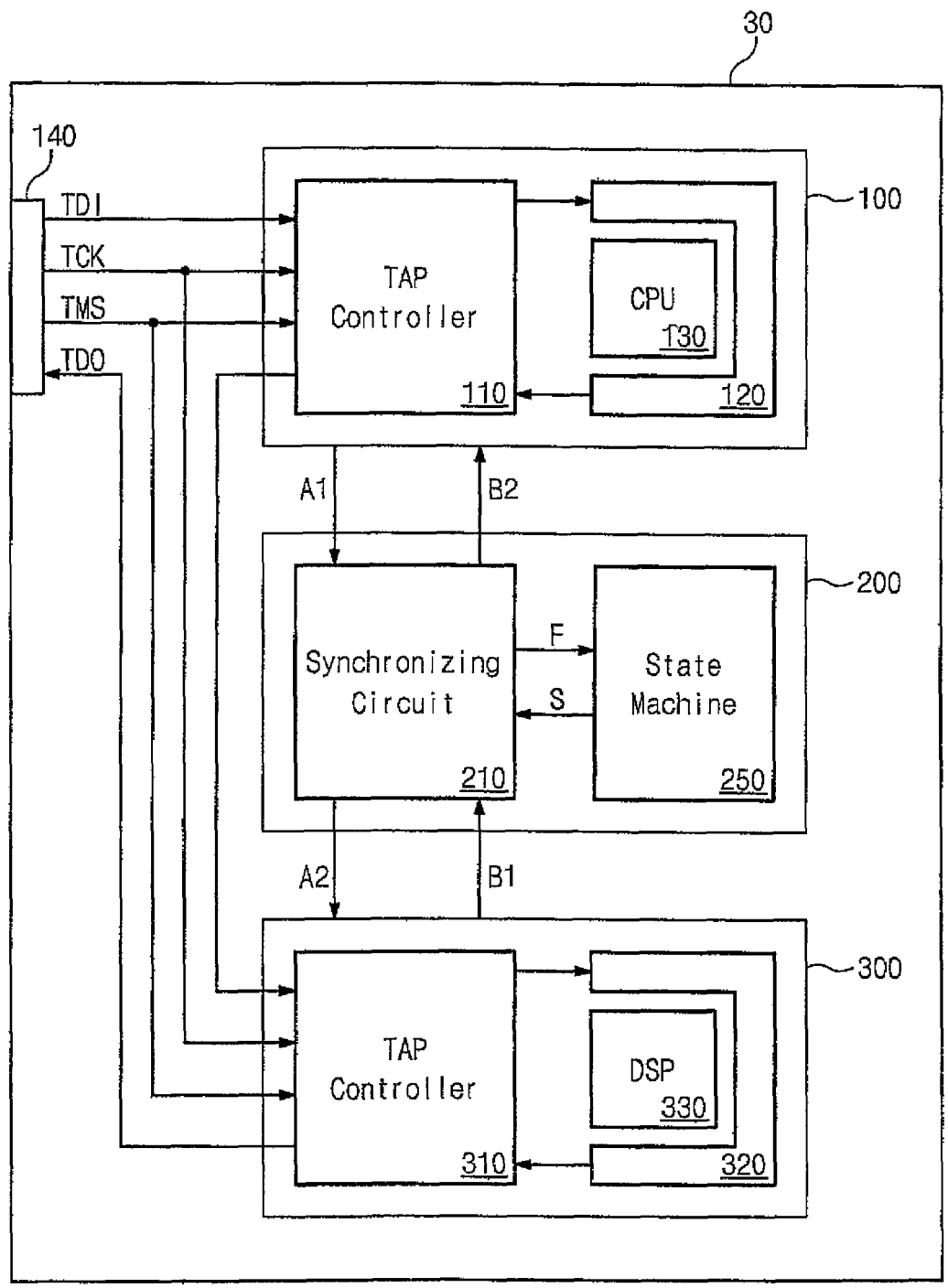
FIG. 2 is a block diagram further illustrating one exemplary embodiment of a semiconductor IC shown in FIG. 1 that supports co-debugging in accordance with another aspect of the present invention.

FIG. 2 is a block diagram of one exemplary embodiment of semiconductor IC 30 supporting the co-debugging function in accordance with the present invention. Semiconductor IC 30, which supports the co-debugging function, receives signals TDI, TCK, and TMS from host interface 20 in FIG. 1 and returns the TDO signal to the host interface following completion of a test.

Referring to FIG. 2, semiconductor IC 30 includes a JTAG terminal 140, a first processor block 100, a trigger circuit 200, and a second processor block 300. First processor block 100 includes JTAG circuits 110 and 120 and a processor core 130. Second processor block 300 includes JTAG circuits 310 and 320 and a processor core 330. Trigger circuit 200 comprises a synchronizing circuit 210 and a state machine 250.

JTAG terminal 140 preferably includes five terminals including TDI, TDO, TCK, TMS, and TRST (not shown). The TDI terminal is a test data input terminal and the TDO terminal is a test data output terminal. The TCK terminal outputs a clock signal for a test and the TMS terminal outputs a test mode select signal.

First processor block 100 includes CPU 130 and JTAG related circuits 110 and 120. CPU 130 is driven by a clock having a first frequency and it outputs a first signal A1 indicating whether first processor block 100 is in a debugging state. When processor block 100 is in the debugging state, A1 has a high logic level. Otherwise, first signal A1 has a low logic level. First processor block 100 receives a fourth signal B2, indicating whether debugging is requested. When debugging is requested, fourth signal B2 has a high logic level. Otherwise fourth signal B2 has a low logic level.

The JTAG circuits of first processor block 100 include TAP controller 110, a boundary scan cell 120 and data registers (not illustrated in FIG. 2). The data registers are conventional and include, for example, a bypass register, a user register, a command register, etc. Generally, a semiconductor IC including a boundary scan test circuit has a JTAG circuit architecture consistent with a standard disclosed, for example, in 'IEEE Std.1149.1-1990'. The JTAG circuits processes data in series so as to reduce a number of required pins.

TAP controller 110 controls the operation of JTAG related circuits 110 and 120 by means of signals input from the TMS and TCK terminals. TAP controller 110 receives the clock signal from the TCK terminal, and the test mode select signal from the TMS terminal. TAP controller 110 executes a control operation depending on what value the signal input from the TMS terminal has when the signal input from the TCK terminal does a low-high transition. Test data is input through the TDI terminal in synchronization with a low-high transition of the signal apparent at the TCK terminal, and output through the TDO terminal in synchronization with a high-low transition.

First boundary scan cell 120 comprises scan registers. The scan registers receive test data from the TDI terminal and perform a boundary scan operation by shifting the data in series. The data output from first boundary scan cell 120 is input to JTAG circuit 320 in order to test second processor block 300.

Second processor block 300 includes DSP 330 and JTAG related circuits 310 and 320. DSP 330 is driven by a clock having a second frequency different from the first frequency. DSP 330 outputs a third signal B1 indicating whether the second processor is in the debugging state. When DSP 330 is in the debugging state third signal B1 has a high logic level. Otherwise, third signal B1 has a low logic level. DSP 330 receives a debugging request second signal A2, indicating whether debugging is requested. When debugging is requested, second signal A2 has a high logic level. Otherwise, second signal A2 has a low logic level.

JTAG circuits 310 and 320 in the second processor block 300 preferably have the same internal architecture and operating principles as JTAG circuits 110 and 120 in first processor block 100.

Trigger circuit 200 comprises synchronizing circuit 210 and state machine 250. State machine 250 controls synchronizing circuit 210. Synchronizing circuit 210 receives a control signal S from state machine 250 and sends a control signal F to state machine 250.

Synchronizing circuit 210 receives first signal A1 indicating whether first processor block 100 is in the debugging state and outputs second signal A2. Synchronizing circuit 210 receives third signal B1 indicating whether second processor block 300 is in the debugging state and outputs fourth signal B2.

When first signal A1 has a high logic level and second processor block 300 is not in the debugging state then second signal A2 assumes a high logic level, which causes second processor block 300 to assume the debugging state. When first signal A1 has a low logic level or second processor block 300 is already in the debugging state then second signal A2 assumes a low logic level.

When fourth signal B2 has a high logic level and first processor block 100 is not in the debugging state then fourth signal B2 assumes a high logic level, which causes first processor block 100 to assume the debugging state. When first signal A1 has a low logic level or second processor block 300 is already in the debugging state then second signal A2 assumes a low logic level.

State machine 250 outputs control signal S to prevent first or second processor block 100 or 300 from repeatedly assuming the debugging state.

Figure 3:
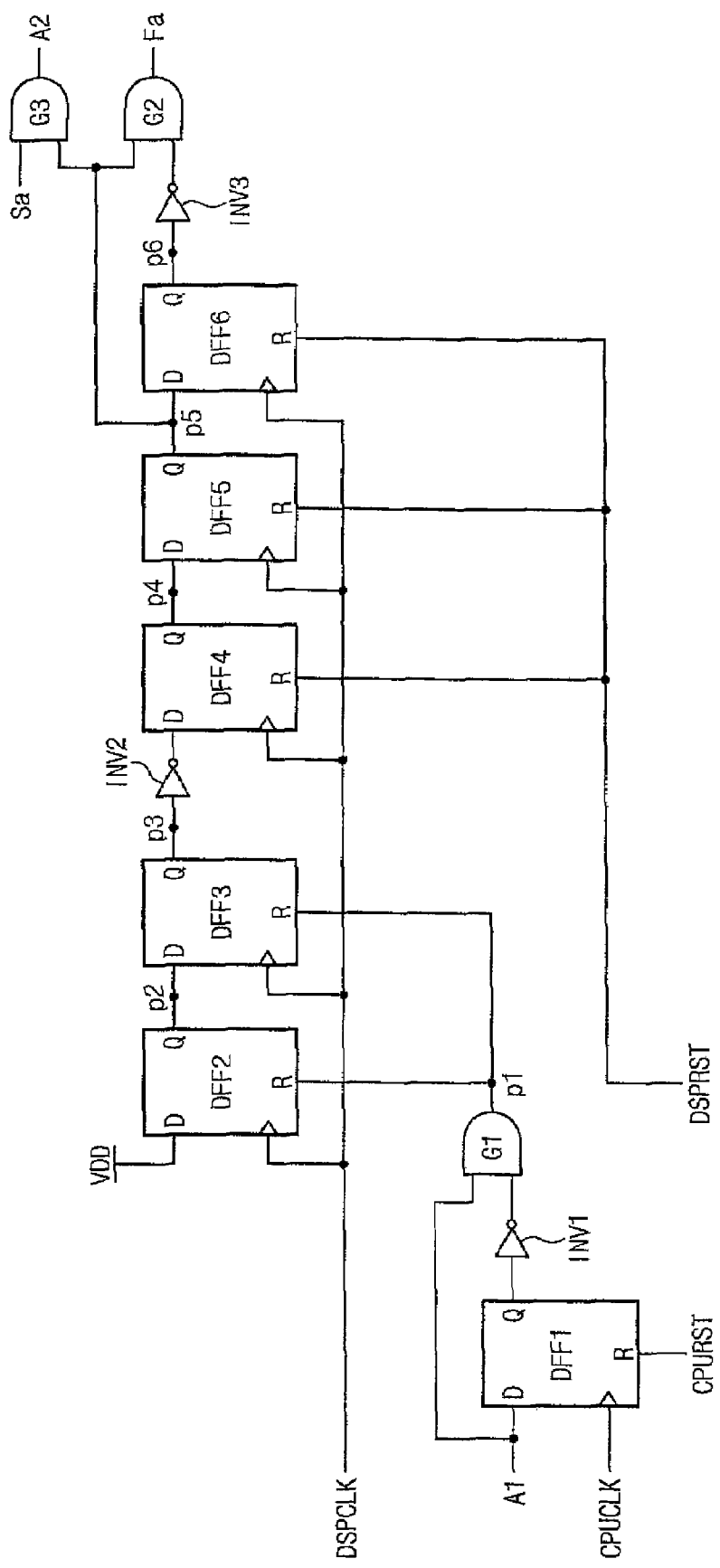
FIGS. 3 and 4 are circuit diagrams illustrating exemplary embodiments for the synchronizing circuit in FIG. 2.

FIG. 3 is a circuit diagram of a first part of an exemplary embodiment of the synchronizing circuit shown in FIG. 2. A circuit diagram of a second part of the same exemplary embodiment is given in FIG. 4.

Synchronizing circuit 211 in FIG. 3 receives first signal A1 from first processor block 100, indicating the debugging state. Synchronizing circuit 211 outputs second signal A2 to second processor block 300, indicating whether a request for debugging is made. If second signal A2 has a high logic level then debugging is being requested. Synchronization circuit 211 also outputs a control signal "Fa" to state machine 250 and receives a control signal "Sa" from the state machine.

Referring to FIG. 3, synchronizing circuit 211 comprises six flipflops DFF1~DFF6, three inverters INV1 through INV3 and three AND gates G1 through G3. First flipflop DFF1 operates in synchronization with a first clock CPUCLK, and second through sixth flipflops DFF2~DFF6 operate in synchronization with a second clock DSPCLK. The first clock and the second clock have different frequencies. Synchronizing circuit 211 receives first signal A1 and outputs second signal A2, signals A1 and A2 being synchronized with the first and second clocks respectively.

Synchronizing circuit 211 outputs a control signal Fa, which is a function of first signal A1, to state machine 150 and receives control signal Sa from state machine 250. Control signal Sa is input to third gate G3. When second processor block 300 is in the debugging state, synchronizing circuit 211, control signal Sa has a low logic level and second signal A2 likewise has a low logic level. As a result, second processor block 300 is not repeatedly sent a debugging request.

Figure 4:
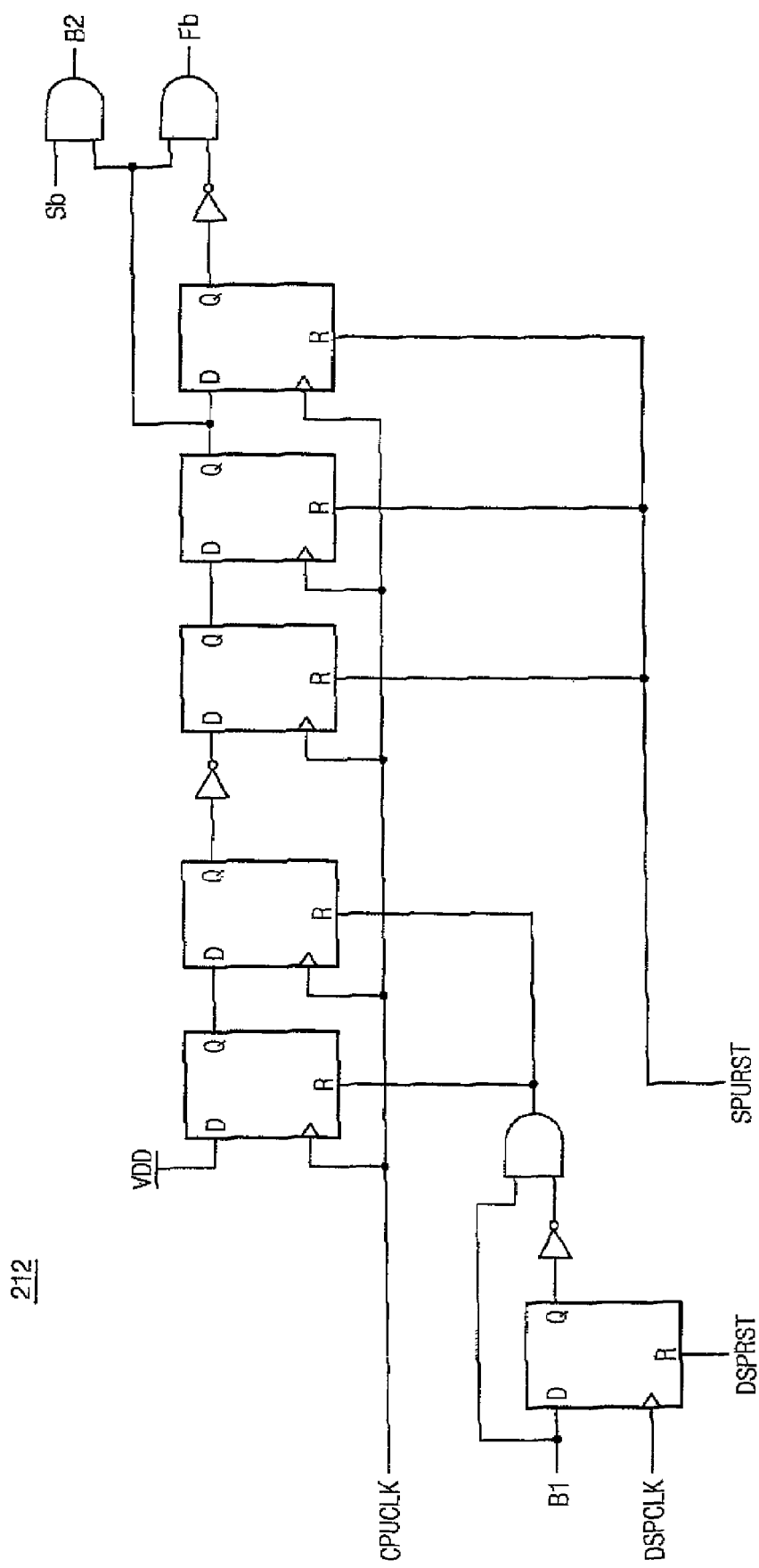

FIG. 4 is a circuit diagram of the second part of the exemplary embodiment of the synchronizing circuit shown in FIG. 2. The general organization and operating principles associated with synchronizing circuit 212 in FIG. 4 are the same as those of synchronizing circuit 211 in FIG. 3, and will not be described in further detail.

However, synchronizing circuit 212 receives a third signal B1 from second processor block 300 indicating whether second processor block 300 is in the debugging state. Third signal B1 determines whether processor block 100 assumes the debugging state.

Figure 5:
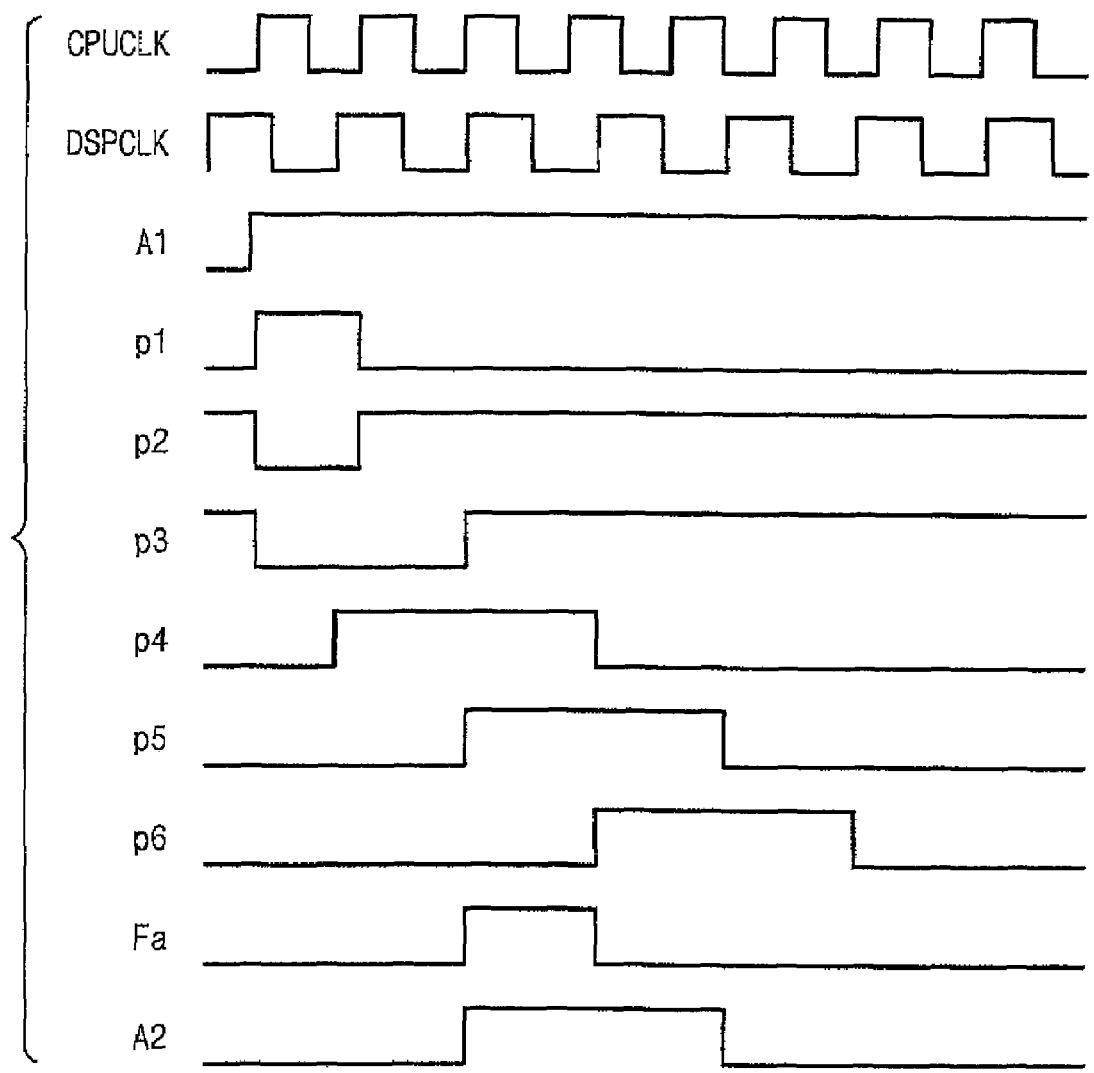
FIG. 5 is a waveform timing diagram further describing the operation of the exemplary synchronizing circuit shown in FIG. 3.

FIG. 5 is a waveform timing diagram further illustrating the operation of the synchronizing circuit shown in FIG. 3.

Referring to FIG. 5, first clock CPUCLK and second clock DSPCLK have different frequencies. The frequency of first clock CPUCLK is higher than that of second clock DSPCLK.

First flipflop DFF1 receives first signal A1 and outputs a signal synchronized with first clock CPUCLK. The signal output by first flipflop DFF1 is received by first inverter INV1 and the output of inverter INV1 is input to first gate G1. First gate G1 receives first signal A1 and the signal output by first inverter INV1 and outputs a first pulse p1.

First pulse p1 is input to a reset terminal of second and third flipflops DFF2 and DFF3. Second flipflop DFF2 generates a second pulse p2 that is an inverse of first pulse p1. Third flipflop DFF3 receives second pulse p2 and outputs a third pulse p3 synchronized with second clock DSPCLK. Second inverter INV2 receives third pulse p3 and the output of inverter INV2 is received by fourth flipflop DFF4, which outputs a fourth pulse p4 synchronized with second clock DSPCLK. Fifth flipflop DFF5 receives fourth pulse p4 and outputs a fifth pulse p5 synchronized with second clock DSPCLK. Sixth flipflop DFF6 receives fifth pulse p5 and outputs a sixth pulse p6 synchronized with second clock DSPCLK.

Sixth pulse p6 is inverted by third inverter INV3. Second gate G2 receives the output of inverter INV3 and fifth pulse p5 and outputs control signal Fa. Control signal Fa is input to state machine 250. Third gate G3 receives fifth pulse p5 and control signal Sa and outputs second signal A2. Second signal A2 is input to second processor block 300.

Third gate G3 determines the logic level of second signal A2 based on the state of second processor block 300. When second processor block 300 is in the debugging state, control signal Sa assumes a low logic level and therefore second signal A2 assumes a low logic level as well. On the contrary, when second processor block 300 is not in the debugging state, control signal Sa has a high logic level. When control signal Sa has a high logic level, second signal A2 assumes the logic level of pulse p5. FIG. 5 illustrates the case where second processor block 300 is not in the debugging state.

As explained above, testing a semiconductor IC which includes two or more processors with one debugger may be accomplished by use of a trigger circuit and related JTAG circuits. The trigger circuit allows one processor to be placed in a debugging state when another processor is in a debugging state. The JTAG circuit is preferably capable of performing a boundary scan by connecting the processor in series when all the processors are in the debugging state.

According to the semiconductor IC and the semiconductor IC test system of the present invention, two or more processors are connected in series with one JTAG pin to reduce the number of pins. In addition, two or more processors can be co-debugged at the same time using a single integrated debugger.

The preferred embodiments disclosed in the drawings and the corresponding written description are teaching examples. Those of ordinary skill in the art will understand that various changes in form and details may be made to the exemplary embodiments without departing from the scope of the present invention which is defined by the following claims.

What is claimed is:

1. A semiconductor integrated circuit (IC) supporting a co-debugging function, comprising:
    a first processor operating at a first frequency and outputting a first signal indicating whether the first processor is in a debugging state;
    a second processor operating at a second frequency different from the first frequency and receiving a second signal adapted to place the second processor in the debugging state;
    a trigger circuit receiving the first signal and outputting the second signal, the first signal being received in synchronization with the first frequency and the second signal being synchronized with the second frequency; and,
    a joint test action group (JTAG) circuit receiving test data from a JTAG terminal, executing a boundary scan operation of the first and second processors, and outputting test result to the JTAG terminal when the first and second processors are in the debugging state.

2. The semiconductor IC of claim 1, wherein the first processor is a central processing unit (CPU) and the second processor is a digital signal processor (DSP).

3. The semiconductor IC of claim 1, wherein the first processor is a first CPU and the second processor is a second CPU.

4. The semiconductor IC of claim 3, wherein the second processor outputs a third signal indicating whether the second processor is in the debugging state;
    wherein the trigger circuit receives the third signal and outputs a fourth signal, the third signal being received in synchronization with the second frequency and the fourth signal being synchronized with the first frequency; and,
    wherein the fourth signal causes the first processor to assume the debugging state.

5. The semiconductor IC of claim 4, wherein the trigger circuit comprises:
    a first synchronizing circuit receiving the first signal and outputting the second signal;
    a second synchronizing circuit receiving the third signal and outputting the fourth signal; and,
    a state machine controlling the first and second synchronizing circuits.

6. The semiconductor IC of claim 5, wherein the state machine causes the second synchronizing circuit to output the fourth signal at a logic level that is not interpreted by the first processor as a debugging request when the first processor is already in the debugging state.

* * * * *